United States Patent [19]

Espinoza

[11] Patent Number: 4,510,650
[45] Date of Patent: Apr. 16, 1985

[54] CABLE CLAMP ASSEMBLY

[75] Inventor: Cesar Espinoza, Buena Park, Calif.

[73] Assignee: Hollingsead International, Inc., Santa Fe Springs, Calif.

[21] Appl. No.: 566,273

[22] Filed: Dec. 28, 1983

[51] Int. Cl.³ .................. B65D 63/00; F16L 33/08
[52] U.S. Cl. ......................... 24/16 PB; 24/17 AP; 24/19; 24/274 R; 248/74.5
[58] Field of Search ............ 24/16 PB, 17 AP, 274 R, 24/19; 248/74.3, 74.5; 292/321, 322

[56] References Cited

U.S. PATENT DOCUMENTS

| | | | |
|---|---|---|---|
| 2,491,290 | 12/1949 | Tinnerman | 24/16 PB |
| 2,632,217 | 3/1953 | Flora | 24/16 PB |
| 2,936,980 | 5/1960 | Rapata . | |
| 2,995,328 | 8/1961 | Whitted . | |
| 3,127,648 | 4/1964 | Emery . | |
| 3,149,808 | 9/1964 | Weckesser | 248/73 |
| 3,214,809 | 11/1965 | Edwards . | |
| 3,300,825 | 1/1967 | Andreasen | 24/16 PB |
| 3,537,146 | 11/1970 | Caveney . | |
| 3,542,321 | 11/1970 | Kahabka . | |
| 3,568,262 | 3/1971 | Woldman . | |
| 3,570,497 | 3/1971 | Lemole . | |
| 3,660,869 | 5/1972 | Caveney et al. . | |
| 3,672,615 | 6/1972 | Florentino . | |
| 3,855,669 | 12/1974 | Meyer | 24/16 PB |
| 3,875,618 | 4/1975 | Schuplin . | |
| 3,900,922 | 8/1975 | McCormick . | |
| 3,913,876 | 10/1975 | McSherry | 248/73 |
| 3,914,832 | 10/1975 | Petrus . | |
| 3,924,308 | 12/1975 | Duprez . | |
| 3,949,449 | 4/1976 | Caveney et al. . | |
| 3,967,345 | 7/1976 | Sumimoto . | |
| 4,021,892 | 5/1977 | Piper . | |
| 4,047,268 | 9/1977 | Buttriss . | |
| 4,099,304 | 7/1978 | Luc . | |
| 4,103,637 | 8/1978 | Luc . | |
| 4,135,272 | 1/1979 | Stephenson | 24/16 PB |
| 4,283,816 | 8/1981 | Tanaka | 248/74.5 |
| 4,303,216 | 12/1981 | Hollingsead | 248/74.5 |

FOREIGN PATENT DOCUMENTS 2615821 11/1976 Fed. Rep. of Germany .
1006129 9/1965 United Kingdom .
1013500 12/1965 United Kingdom .

Primary Examiner—Victor N. Sakran
Attorney, Agent, or Firm—Jackson, Jones & Price

[57] ABSTRACT

A wire bundle or cable clamp primarily adapted for use in the aviation industry is disclosed. The clamp includes a flexible strap having a serrated portion and a strap receiving member to which the strap is mounted onto the strap receiving member and is biased to engage the serrations of the strap. The strap includes an enlarged head at one end and the strap receiving member includes an opening on one side thereof to receive and hold the enlarged head of the strap when it is inserted in a direction perpendicular to a plane formed by the central axis of the strap when the strap extends around a wire bundle or the like so that the enlarged portion of the strap may be looped around the wire bundle and then inserted into the strap receiving member while the other end is secured in the strap receiving member by the pawl. The free end of the strap extending beyond the pawl may then be grasped and pulled to tighten the strap around the wire bundle.

13 Claims, 6 Drawing Figures

U.S. Patent   Apr. 16, 1985   Sheet 1 of 2   4,510,650
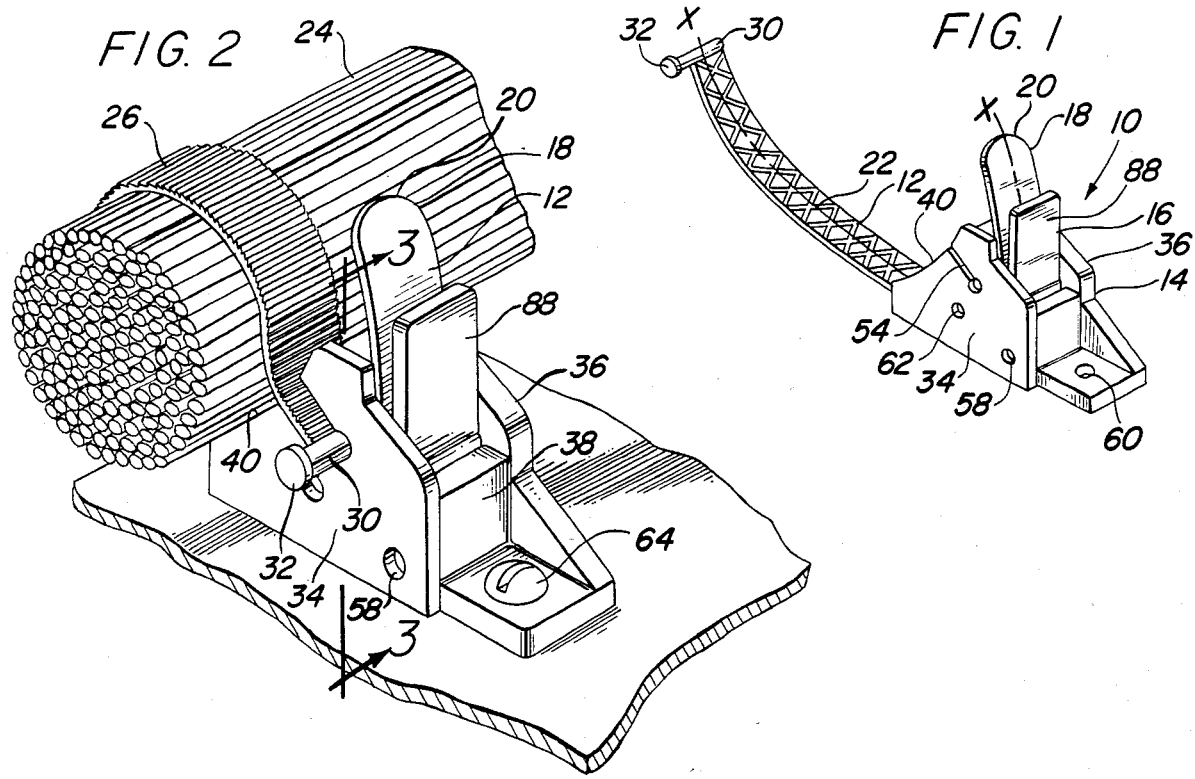
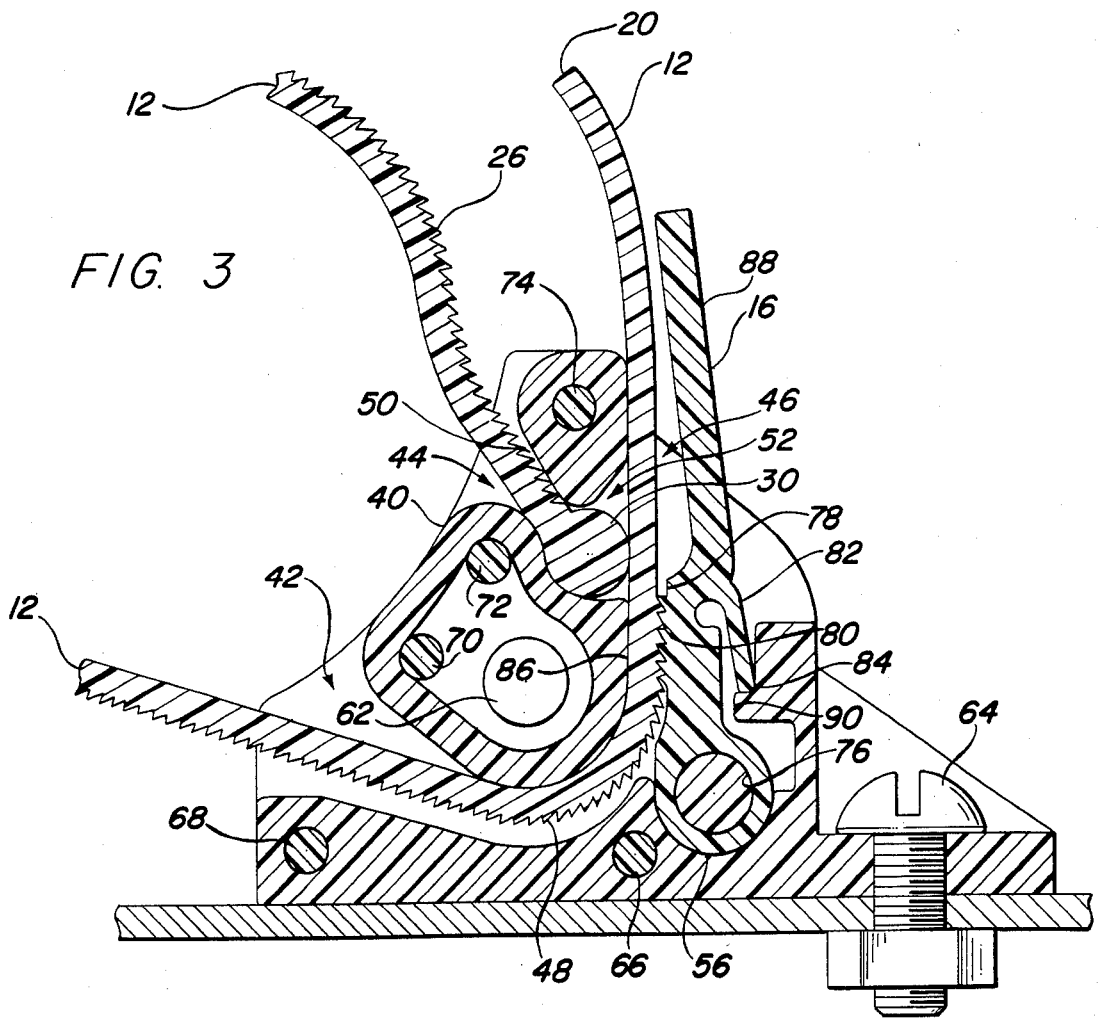

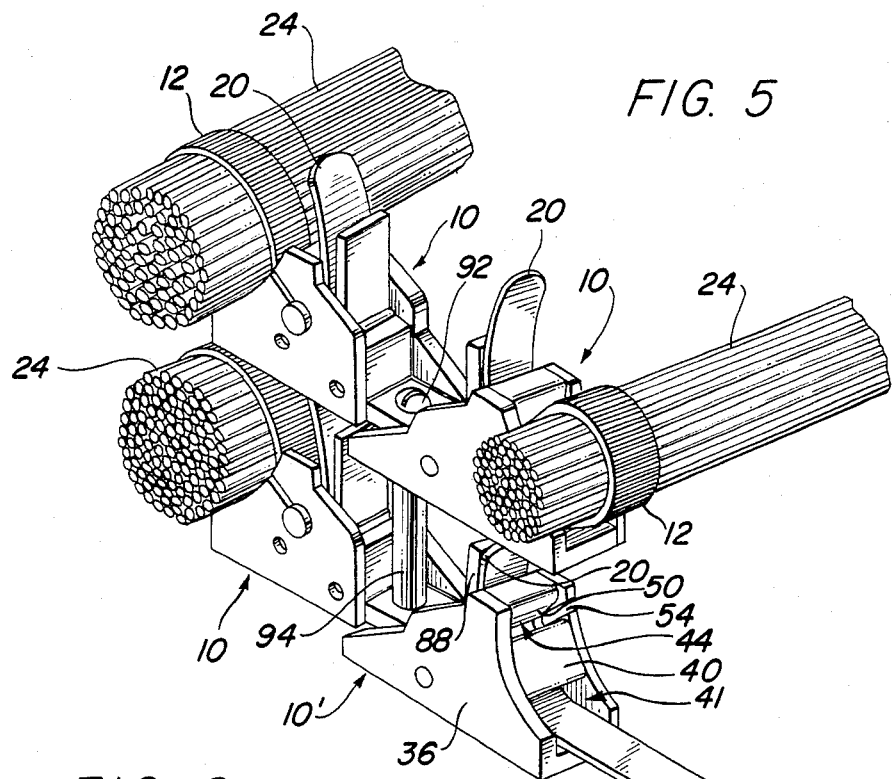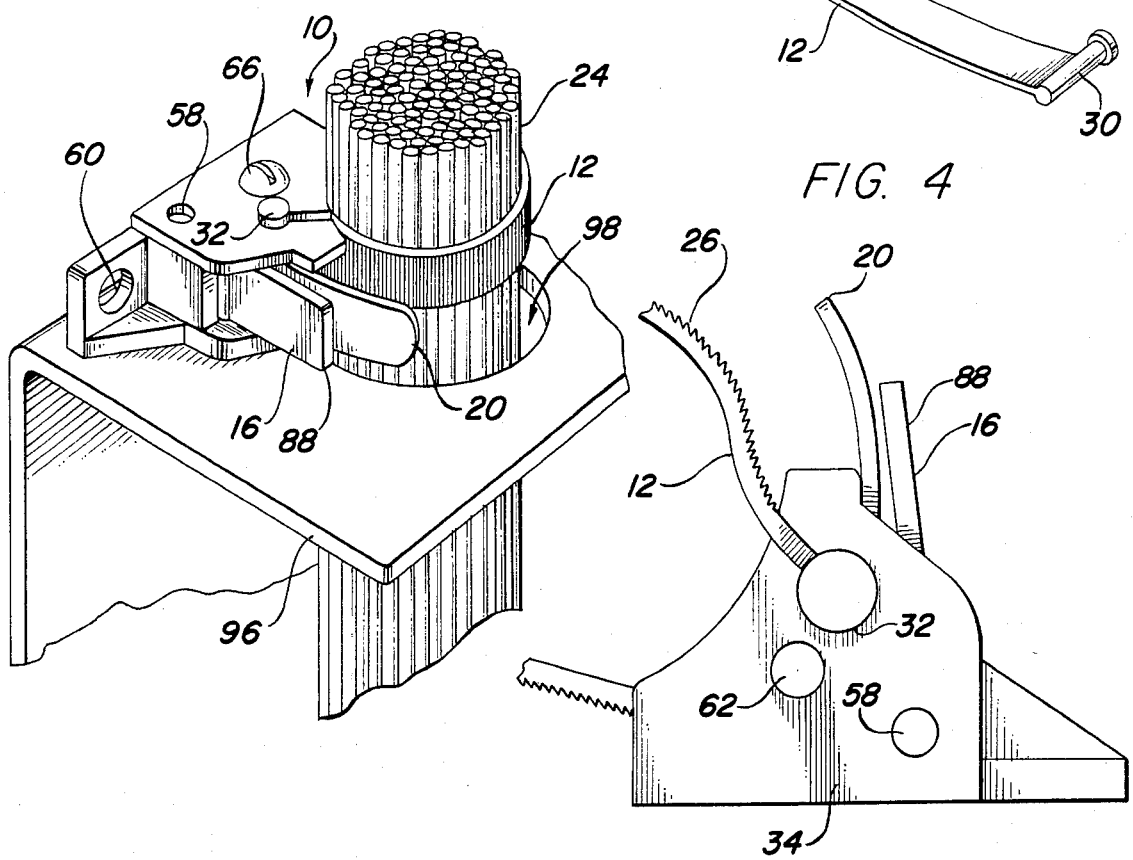

CABLE CLAMP ASSEMBLY

BACKGROUND OF THE INVENTION

1. Field of the Invention

The present invention is broadly directed to cable and wire bundle clamps. More particularly, the present invention is directed to cable or wire bundle clamp assemblies which require no tools for fastening the clamp about the cable or wire bundle.

2. Brief Description of the Prior Art

Clamps for securing wire bundles, hoses, cables, and the like are well known to the prior art. Most of such clamps include an elongated strap which is designed to be disposed around the wire bundle or cable or other object to be gripped, and a fastener or strap receiving member to hold the strap in place once it is tightened around the wire bundle. The fastener or strap receiving member is usually permanently attached to one end of the strap, while the other end of the strap is either looped around the wire bundle and then inserted through an opening in the strap receiving member or the clamp is slipped over the object to be secured while both ends are held by the strap receiving member. The length of the strap extending around the wire bundle, etc., is then adjusted either manually by pulling on the free end of the strap or by means of a worm gear or screw which is designed to mate with appropriate teeth in the strap. In the former type of clamp the strap includes serrations which mate with a pawl member or the like secured to or formed integrally with the strap receiving member. Examples of the former type of clamps are found in U.S. Pat. Nos. 3,127,648; 3,900,922; 2,936,980; 3,537,146; 3,660,869; 3,568,262; 3,542,321; 3,949,449; 3,875,618; 3,967,345; 3,570,497 and German Pat. No. 2,615,821 and examples of the latter type are found in U.S. Pat. Nos. 4,021,892; 3,914,832; 4,047,268; 3,924,308; 4,103,637; 4,099,304; 3,214,809 and British Patent Specification Nos. 1,013,500 and 1,006,129. Additional disclosures generally relating to adjustable strap or band clamps are found in U.S. Pat. Nos. 2,995,328; 4,135,272; and 3,672,615. U.S. Pat. No. 4,135,272 relates to a connecting device for use with mops and the like in which a separate strap and a connector are provided, with the strap being inserted through an opening in the connector then looped around the material to be secured (mop head), past a pawl-type member which engages serrations on the strap and out through another opening. U.S. Pat. No. 3,672,615 relates to a strap support member which simply secures a strap and an integral fastener to a support surface. U.S. Pat. No. 2,995,328 relates to a cable or electrical wire-type fastener in which a post on the strap is provided for engaging one of two openings in the strap after it has been looped around a wire cable.

As is well appreciated by those skilled in the art, cables, wire bundles or hose clamps used in such areas as aircraft should meet special strict requirements. For example, in an aircraft environment numerous cables and wire bundles must be secured to bulkheads, skin sections, etc., where there is very limited access. Thus the installer may find it not only difficult or impossible to use a tool to manipulate the clamp but may be unable to use more than one hand to fasten the clamp around the wire bundle, etc. The threading of the free end of the strap through the prior art fasteners with one hand is difficult, especially where access and/or visibility is limited. Wire bundles in aircraft are also often arranged in stacks or rows. While conventional prior art aircraft clamps of the C type allow the stacking of wire bundles in a stacked or Christmas tree fashion, all of the clamps above the one requiring attention be removed before the mechanic or electronic technician can even get to the clamp which is holding the object to be removed. This involves a time-consuming and therefore expensive process. Such C type clamps also have the disadvantage of tending to pinch the wires which are adjacent the ends of the clamp secured by the bolt to the aircraft frame.

Clamps used in aircraft, as well as certain other environments, are also often subjected to extreme temperatures and severe vibration. Clamps fulfilling some of the needs in the prior art—especially for aircraft environments—are described in U.S. Pat. No. 4,303,216 and Application Ser. No. 201,982 for "AVIONIC CLAMP HAVING SEPARATE STRAP AND LOCKING MEMBERS," which patent and application are assigned to the same assignee as the present application.

The clamp described in U.S. Pat. No. 4,303,216 is of the worm or screw type and therefore a tool, such as a screwdriver or a wrench, is required to tighten the clamp. The clamp described in the above-mentioned application requires no such tool and is arranged to be manually tightened and readily disassembled. However, the clamp does require that the free end of the strap be inserted into and pushed through an opening in the strap receiving member after it has been looped around the wire bundle or cable before the free end protruding beyond the strap receiving member can then be grasped to tighten the strap. In areas where there is limited access it has been found that it is difficult for an operator to push the free end of the strap through the opening in the strap receiving member and past the serrated pawl after the strap has been looped around the wire bundle or cable.

The present invention is designed to fill the need in the prior art for a cable or wire bundle clamp which generally meets the requirements of an aircraft or similar hostile environment and which can be clamped around the cable or bundle of wires in an area with limited access and subsequently released.

SUMMARY OF THE INVENTION

The clamp assembly of the present invention includes a flexible elongated strap having a central axis extending lengthwise of the strap, first and second ends and serrations on one side. The central axis defines a plane when the strap is looped around a wire bundle or the like. The second end of the strap defines a securing means which may be in the form of an enlarged head. A strap receiving member is provided with a serrated pawl and a first passageway extending between two openings and past the pawl to receive the first end of the stap. The pawl is biased against the strap when it is inserted into said passageway so that the serrations of the strap and the pawl allow the strap to be moved in a direction to shorten the length of the strap and thereby secure the wire bundle or the like and prevent the strap from moving in the opposite direction.

The strap receiving member includes a second passageway extending from a third opening, the second passageway opening through one side of the strap receiving member for accepting and immobilizing the second end of the strap when the second end of the strap is looped around the wire bundle to be secured and then inserted into the strap receiving member in a direction substantially perpendicular to the plane defined by the central axis of the strap. The first end of the strap may then be pulled to tighten the strap around the wire bundle. The biasing force on the pawl may be overcome by an outside force to permit an operator to remove the strap from the wire bundle.

The features of the present invention can best be understood by reference to the following descriptions, taken in connection with the accompanying drawings, wherein like numerals indicate like parts.

BRIEF DESCRIPTION OF THE DRAWINGS

FIG. 1 is a perspective view of a preferred embodiment of a wire bundle or cable clamp of the present invention showing the strap in an open position;

FIG. 2 is another perspective view of the clamp showing the strap looped around a wire bundle with the enlarged head of the strap being partially inserted into the side of the strap receiving member;

FIG. 3 is a cross-sectional view of the clamp taken along line 3,3 of FIG. 2;

FIG. 4 is a side view of the clamp;

FIG. 5 is a perspective view of several clamps of the present invention secured in a Christmas tree fashion with the strap of one of the lower clamps in an open position; and FIG. 6 is another perspective view of a clamp in accordance with the present invention showing the clamp connected to a bulkhead and holding a wire bundle away from the edge of the bulkhead opening.

DESCRIPTION OF THE PREFERRED EMBODIMENT

The following specification, taken in conjunction with the drawings, sets forth the preferred embodiment of the present invention in such a manner that any person skilled in the wire bundle, cable or hose clamp manufacturing arts can use the invention. The embodiment of the invention disclosed herein is the best mode contemplated by the inventor for carrying out his invention, although it should be understood that various modifications can be accomplished within the parameters of the present invention.

Referring now to FIGS. 1-3 and particularly to FIG. 1, a preferred embodiment of the wire bundle or cable clamp 10 of the present invention is disclosed. The clamp 10 includes the following major component parts: an elongated strap 12, a strap receiving member or housing 14, and a pawl member 16.

The strap 12 is an elongated, substantially flat, flexible member having rounded sides 18 adjacent to the front or first end 20 thereof. One side of the strap has a raised or grid-like pattern 22, the purpose of which is to facilitate the gripping of a wire bundle 24 as is illustrated in FIG. 2. The other surface of the strap is provided with a plurality of regularly spaced and parallel aligned serrations 26 as may best be observed in FIG. 3. The serrations need not extend the entire length of the strap but need only extend along that portion which is intended to engage the pawl 16.

The serrations 26, which are best shown in FIG. 3, act as teeth to engage complementary serrations in the pawl 16 to lock the strap 12 around a wire bundle or the like.

The second end of the strap 12 terminates in a securing means in the form of an enlarged head 30, best shown in FIGS. 1, 2 and 5, which permits the second end of the strap to be removably secured to the housing 14 as will be described. The enlarged head includes a cap or shoulder 32 on one side to prevent the second end of the strap from being improperly inserted into an opening in the side of the housing 14, as will be explained.

The strap has a central axis x—x which defines a plane that bisects the housing 14 when the strap is curved to loop around a wire bundle such as bundle 24 in FIG. 2. The plane defined by the central axis x—x also extends at right angles to the longitudinal axis of the wires in the bundle secured by the clamp 10.

The strap 12 may be made of any suitable material. However, preferably the strap 12 is molded of a suitable plastic material such as polyethylene, polyamide, polyacetal and the like. For utilization in the aviation industry, the strap may be made from a polyamide material commercially available in the United States under the trade name HYTREL, which material is useful at extreme temperatures.

Referring now principally to FIGS. 2, 3 and 5, the strap receiving member or housing 14 includes two substantially parallel-disposed sidewalls 34 and 36 and a main body portion 38 extending therebetween. A wire bundle or cable receiving surface 40 is formed by the main body portion 38 and the side walls 34 and 36 to conform to the rounded shape of the wire bundle as is illustrated, for example, in FIG. 2. The main body portion 38 defines first and second slots or elongated openings 42 and 44 on either side of the bundle receiving surface 40 for receiving the first and second ends of the strap 12, respectively, as is illustrated in FIGS. 3 and 5.

The main body portion also defines a third slot or elongated opening 46 spaced from the first opening 42 and a first passageway 48 extending between the first and third slots for receiving the first end 20 of the strap 12.

The main body also defines a passageway 50 which joins the third slot 46 with a chamber or cavity 52 adapted to receive the second end 30 of the strap 12 as is shown in FIG. 3. The passageway 50 is dimensioned so that the enlarged head 30 of the strap 12 will not pass therethrough in a direction along its central axis X—X as shown. The sidewall 34 includes an opening 54 therein which is complementary to the passageway 52 and chamber 52 so that the second end 30 of the strap 12 may be inserted into the housing in a sidewise direction, i.e., a direction that is perpendicular to sidewalls 34 and 36 and to the plane formed by the central axis x—x of the strap 12 when looped around an object (wire bundle) to be secured. The cap 32 at the second end 30 of the strap is dimensioned so that it will not pass through the opening 54 in the sidewall 34 to prevent the second end 30 of the strap 12 from being inserted the wrong way, i.e., with the serrations toward the wire bundle 24.

The housing 14 includes a post 56 which extends from the sidewall 36 through an opening 58 in the sidewall 34. The post 56 serves as an axle for mounting the pawl 16 as will be described. The housing also includes a pair of mounting holes 60 and 62 extending therethrough for permitting the housing to be mounted by means of a suitable bolt 64 through hole 60 (FIG. 2) with the sidewalls perpendicular to the mounting surface or by means of a bolt 66 through hole 62 with the sidewall being aligned parallel to the mounting surface (FIG. 6). While the housing and pawl 14 may be made of any appropriate material which has sufficient strength and durable characteristics for the anticipated environment, they are preferably made of glass reinforced HYTREL when the clamp is to be used on aircraft. When made of plastic it is convenient to mold the housing in two parts with the main body portion 38 and the sidewall 36 formed in one piece. The sidewall 34 includes five alignment pins 66, 68, 70, 72 and 74 which mate with complementary openings in the main body portion 38 to insure the proper mating of the two halves of the housing. Cement or glue may be used to secure the two halves of the housing together after the pawl has been mounted on the post 56.

In order to permit the strap to be tightened around a wire bundle or the like the pawl 16 is mounted to the housing 14 by means of bore 76 which fits over the post 56. The pawl 16 includes a substantially flat plate portion 78 which has a serrated surface 80 extending within the passageway 48 to engage the complementary serrations 26 on the strap 12. The pawl includes a resilient tongue 82 which engages a shoulder 84 in the main body portion 38 of the housing 14 to resiliently force the serrated portion 80 of the pawl 16 against the strap 12.

The main body portion 38 also includes a bearing surface 86 against which the strap 12 is pressed by the pawl 16 as is shown in FIG. 3.

The serrations of the strap 12 and of the pawl 16 are complementary to one another and both are inclined in such a manner that movement of the first end of the strap 12 in a direction to shorten the length of the loop around the wire bundle is possible by a successive engagement and disengagement of the serrations. However, movement of the strap 12 in the opposite direction whereby the loop would be lengthened is not possible as long as the pawl 16 bears down on the strap 12.

The upper portion 88 of the pawl 16 forms a lever to enable an operator to push the pawl away from the strap 12 against the biasing force provided by the tongue 82. The housing includes a stop member 90 which limits the movement of the pawl 16 in a direction away from the strap 12. When the lever portion of the pawl 16 is pushed back so that the serrations of the pawl 16 are disengaged from the serrations of the strap 12, the strap is free to move in either direction, and therefore in this position of the pawl 16, the strap may be moved to loosen or remove the loop around the wire bundle 24.

The present invention permits an operator to insert the first end of the strap through the strap receiving member of the housing so the first end extends through the passageway 48 past the pawl and out of the opening 46. The strap receiving member may then be mounted to a surface along which the wire bundles are to be assembled. The second end of the strap may then be looped around the desired wire bundle or cable and inserted through the side opening in the strap receiving member by one hand until the enlarged head thereof is seated in the mating chamber 52. The first end of the strap may then be grasped and pulled until the wire bundle or cable is tightly secured to the strap receiving member.

Referring now to FIG. 4, there is illustrated a Christmas tree arrangement of clamps 10 and clamp 10' (lower right) securing wire bundles 24 to a support surface (not shown). A bolt 92 and spacer 94 hold the clamps 10 and 10' in a spaced-apart relationship as shown. The first or front end of the strap 12 extends through the strap receiving member 14 of the clamp 10' as shown. The strap 12 of this clamp 10' is in an open configuration, with the second end 30 thereof free from the strap receiving member. Once the wire bundle to be secured is placed adjacent the bundle receiving surface 40 of the clamp 10' the second end of the strap 12 may be looped around the bundle and the enlarged head 30 and adjacent portion of the strap may then be inserted into the opening 54, passageway 50 and chamber 52. The first end 20 of the strap 12 for the clamp 10' may then be pulled to secure the wire bundle to the clamp. If it is necessary to remove the wire bundle or an individual wire therein from the clamp 10', it is only necessary for the operator to push the lever portion 88 of the pawl 16 in a direction away from the spacer 94 so that the serrations of the pawl and strap are disengaged. The strap may then be readily pushed through the passageway 48 to lengthen the portion of the strap which forms a loop around the wire bundle. Once there is sufficient slack in the strap 12, the second end 30 thereof may be slid sidewise (i.e., in a direction away from the side 36) out of the strap receiving member and into the open position as shown for the clamp 10'.

FIG. 6 illustrates a clamp of the present invention holding a wire bundle 24 and mounted adjacent a bulkhead 96. In this mounting arrangement the clamp serves two functions. It holds the wire bundle in place and also prevents the wires from contacting the sides of the hole 98 in bulkhead 96. This eliminates the need for the rise of a grommet within the hole 98 to protect the wire bundle.

There has thus been described a clamp especially suitable for the aviation industry which may be closed (and subsequently opened) around a wire bundle in areas of limited access.

The clamp 10 of the preferred embodiment is resistant to fire, aromatic fuels, lubricating oils, synthetic hydraulic fluids, various solvents, etc. The preferred embodiment of the clamp may also be subjected to the temperature extremes normally encountered in an aircraft environment.

What is claimed is:

1. In a clamp assembly adapted for clamping wire bundles and attaching the same to a housing or the like, the combination comprising:

a flexible elongated strap member having a first, a second end, and serrations on a major portion of one side, the second end defining a securing means;

a substantially rigid strap receiving member having a pair of sidewalls, a bundle receiving surface disposed substantially at right angles to the sidewalls, first and second slot-like openings on either side of the bundle receiving surface, a third slot-like opening spaced from the first opening, a first passageway including a bearing surface and extending inside the sidewalls between the first and third openings for receiving the first end of the strap member and a second passageway extending from the second opening for receiving the second end of the strap when inserted in a direction generally perpendicular to the sidewalls, the second passageway being dimensioned to engage the securing means on the second end of the strap member and prevent the second end of the strap member from passing therethrough in response to a pulling force on the first end of the strap member, one of said sidewalls defining an opening aligned with the second passageway so that the second end of the strap member may be inserted into the second passageway in a direction generally perpendicular to the sidewalls and be held captive therein; and a pawl member having serrations complementary to the serrations on the strap member and secured to the strap receiving member adjacent the first passageway and on the opposite side thereof from the bearing surface; and means for biasing the pawl member against the strap member whereby the serrations on the pawl member releasably engage the serrations on the strap member.

2. The invention of claim 1 wherein the serrations of the strap are disposed at substantially right angles to the general longitudinal axis of the strap.

3. The invention of claim 2 wherein the securing means on the second end of the strap comprises an enlarged head, and the second passageway in the strap receiving member includes a chamber for receiving the enlarged head.

4. The invention of claim 1 wherein the pawl member includes a handle portion extending out of the strap receiving member to permit the pawl member to be manually forced against the biasing means and away from the strap member whereby the strap member may be moved along the first passageway in a direction to increase the length of the strap member extending between the first and second openings.

5. The invention of claim 4 wherein the enlarged head on the second end of the strap member defines a protuberance on one side thereof, the protuberance being dimensioned so that it will not pass through the opening in said one sidewall whereby the improper insertion of the second end of the strap member into the second passageway of the strap receiving member is substantially prevented.

6. The invention of claim 5 wherein the strap receiving member defines at least one hole therethrough adapted to receive a bolt.

7. In a clamp assembly adapted for clamping wire bundles and attaching the same to a housing or the like, the combination comprising:

a flexible elongated strap member having a central axis extending lengthwise of the strap member first and second ends, and serrations on a major portion of one side, the central axis defining a plane when the strap is curved to extend around a bundle of wires, the second end including an enlarged head;

a substantially rigid strap receiving member having a pair of sidewalls, a bundle receiving surface disposed substantially at right angles to the plane defined by the central axis of the strap member, first and second slot-like openings on either side of the bundle receiving surface, a third slot-like opening spaced from the first opening, a first passageway having a bearing surface and extending from the first to the third opening for receiving the first end of the strap, a chamber adapted to accomodate the enlarged head of the strap member, and a second passageway extending from the second opening to the chamber for receiving the second end of the strap when inserted in a direction substantially perpendicular to the plane defined by the central axis, the second passageway being dimensioned to engage the enlarged head on the second end of the strap member and prevent the second end of the strap member from passing therethrough in response to a tensile force on the first end of the strap member, one of said sidewalls defining an opening aligned with the second passageway and the chamber so that the second end of the strap member may be inserted into the second passageway in a direction substantially perpendicular to the plane defined by the central axis and be held captive therein; and a pawl member having serrations complementary to the serrations on the strap member and secured to the strap receiving member adjacent to the bearing surface of the first passageway so that the strap member is wedged between the bearing surface and the pawl member when the first end of the strap member is pulled to tightly secure a wire bundle or the like to the clamp assembly, the serrations on the pawl and strap members being arranged to allow the strap member to move in a direction to shorten the length thereof between the first and second openings and prevent the strap member from moving in the opposite direction.

8. The invention of claim 7 wherein the pawl member includes a handle portion extending out of the strap receiving member to permit the pawl member to be manually forced against the biasing means and away from the strap member whereby the strap member may be moved along the first passageway in a direction to increase the length of the strap member extending between the first and second openings.

9. The invention of claim 7 wherein the enlarged head on the second end of the strap member defines a protuberance on one side thereof, the protuberance being dimensioned so that it will not pass through the opening in said one sidewall whereby the improper insertion of the second end of the strap member into the second passageway of the strap receiving member is substantially prevented.

10. The invention of claim 8 wherein the strap receiving member defines at least one opening therethrough for receiving a bolt to secure the clamp assembly to a suitable surface.

11. The invention of claim 10 wherein the securing means is in the form of an enlarged head on the second end of the strap and wherein the second passageway in the strap receiving member defines a cavity arranged to accommodate the enlarged head of the strap, the second passageway between the cavity and the third opening being dimensioned to prevent the enlarged head from passing therethrough.

12. In a clamp adapted for securing a wire bundle or the like to a mounting surface, the combination which comprises:

a flexible elongated strap having a central axis extending lengthwise of the strap, first and second ends and serrations on one side, the second end of the strap defining securing means;

a strap receiving member having a pair of openings therein, a first passageway having a bearing surface and extending between the pair of openings for receiving the first end of the strap, a third opening and a second passageway, the second passageway extending from the third opening and through one side of the strap receiving member for receiving the second end of the strap when inserted into the strap receiving member in a direction substantially perpendicular to the plane defined by the central axis of the strap when looped around an object to be secured, the second passageway including means for cooperating with the securing means to prevent the second end of the strap from being removed from the strap receiving member when subjected to a pulling force directed along the central axis; and a pawl secured within the first passageway of the strap receiving member adjacent the bearing surface and biased in a direction to force the strap against the bearing surface when disposed within the first passageway, the pawl having serrations adapted to engage the serrations on the strap to immobilize the strap against a pulling force on the second end of the strap in the strap receiving member.

13. In a clamp assembly adapted for clamping wire bundles and the like, the combination which comprises:

a flexible elongated strap having a first and second end and serrations on a portion of one side, the second end defining a securing means;

a substantially rigid strap receiving member having a pair of sidewalls, a passageway including a bearing surface extending inside the sidewalls for receiving the first end of the strap and an opening in said strap receiving member extending through one of said sidewalls thereof for receiving the second end of the strap when inserted in a direction generally perpendicular to the sidewalls, the strap receiving member including means cooperating with said securing means for securing the second end of the strap against movement along the length thereof, whereby the first end of the strap may be inserted through the passageway of the strap to extend beyond the strap receiving member and the second end may then be looped around the wire bundle or the like and inserted into said opening; and a pawl member having serrations complementary to the serrations on the strap and secured to the strap receiving member adjacent the passageway and on the opposite side thereof from the bearing surface and means for biasing the pawl member against the strap whereby the serrations on the pawl member releasably engage the serrations on the strap.

* * * * *